June 15, 1948.  C. N. GUERASIMOFF  2,443,502
ENGINE CONSTRUCTION
Filed Feb. 8, 1941  6 Sheets-Sheet 1
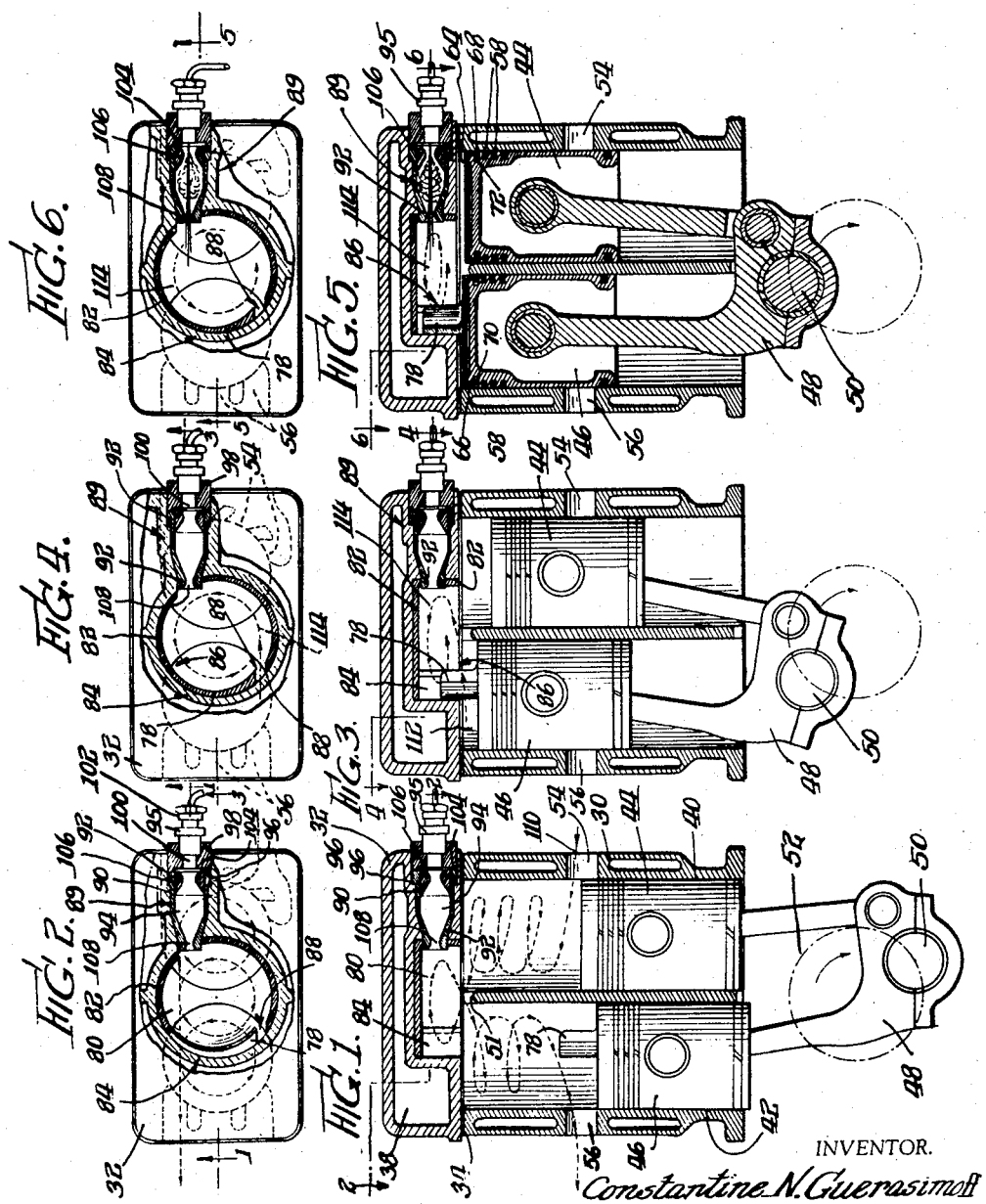
INVENTOR.
Constantine N. Guerasimoff
BY: Cox Moore & Olson
ATTORNEYS.

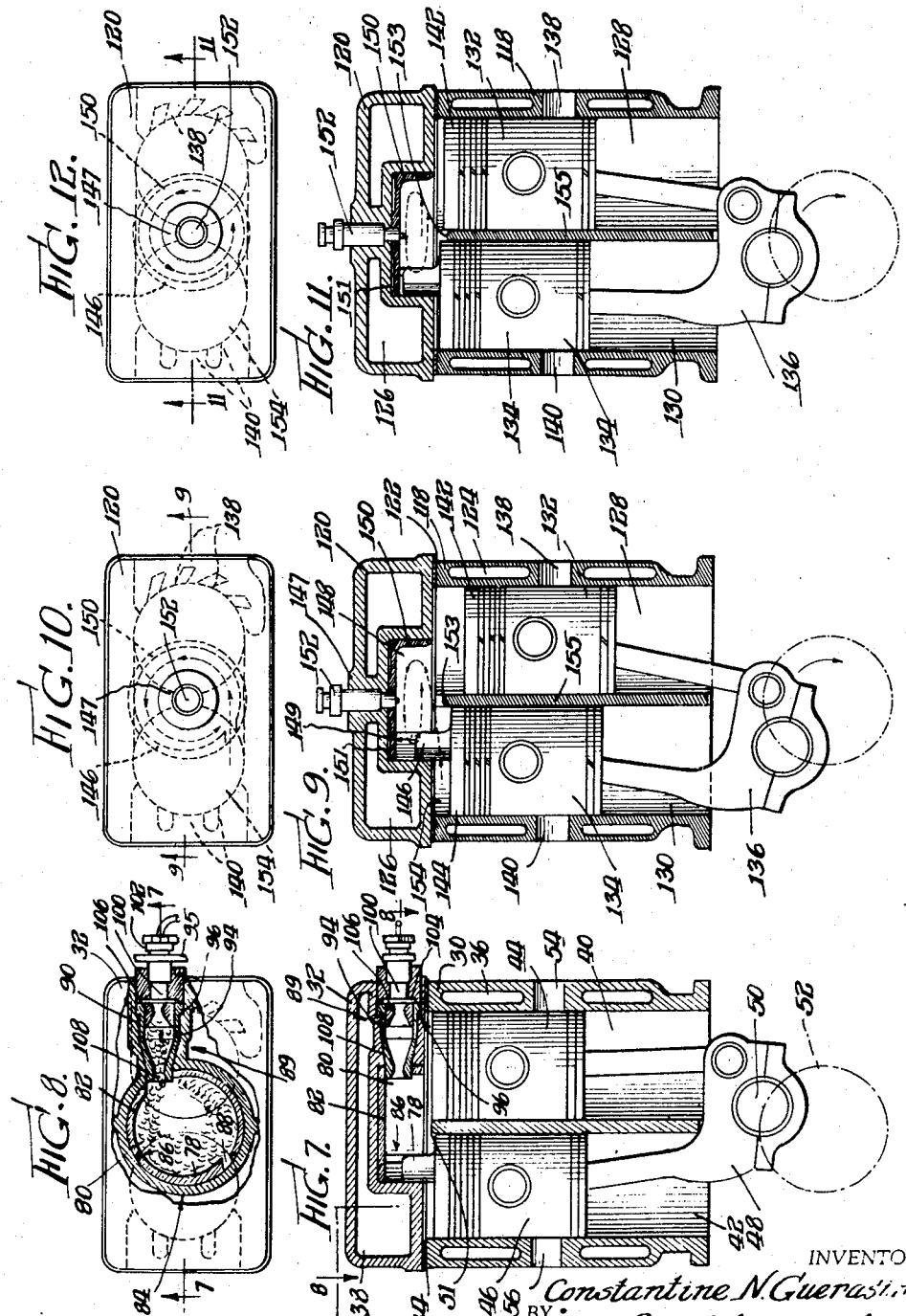

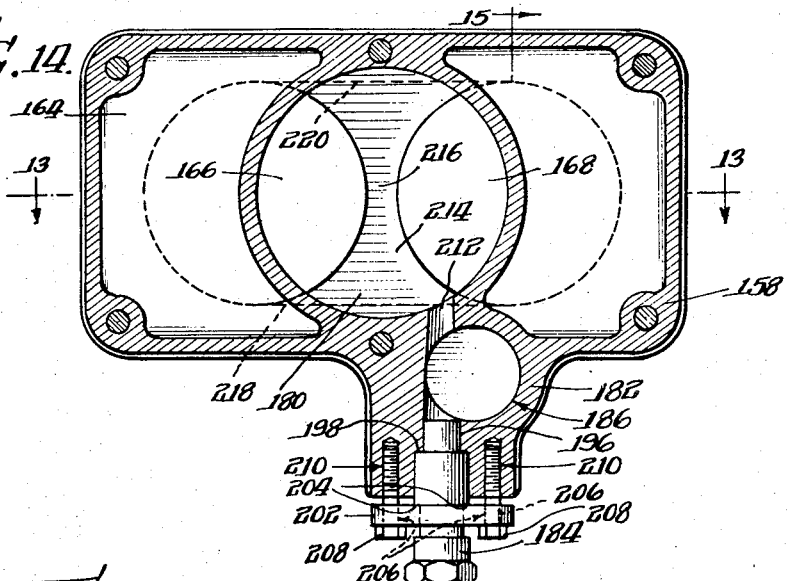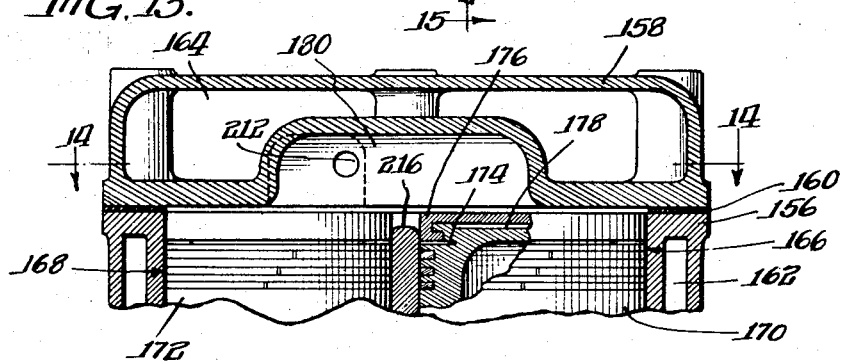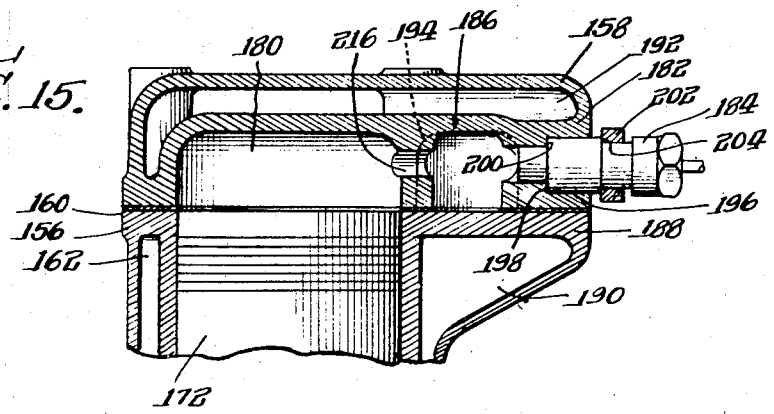

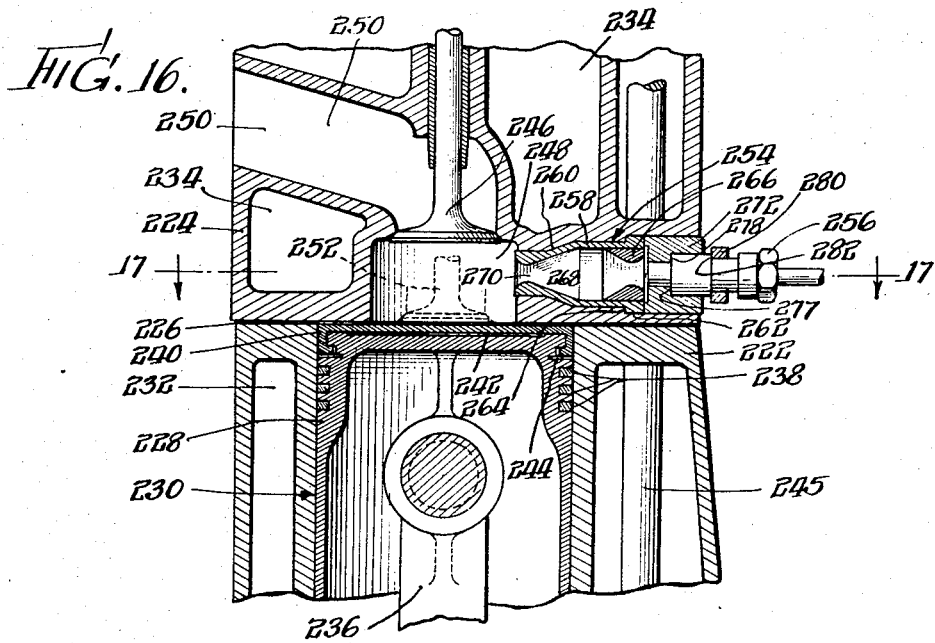
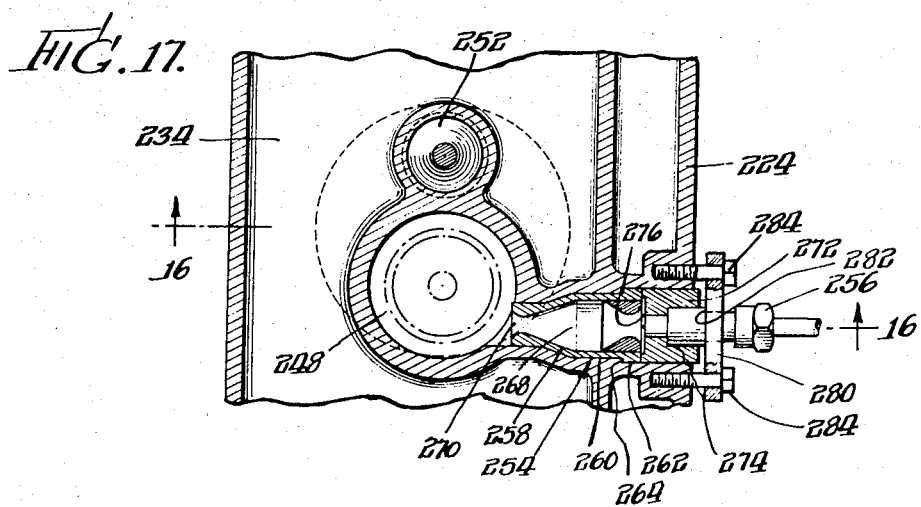

June 15, 1948. C. N. GUERASIMOFF 2,443,502
ENGINE CONSTRUCTION
Filed Feb. 8, 1941 6 Sheets-Sheet 5

INVENTOR.
Constantine N. Guerasimoff
BY Cox Moore & Olson
ATTORNEYS.

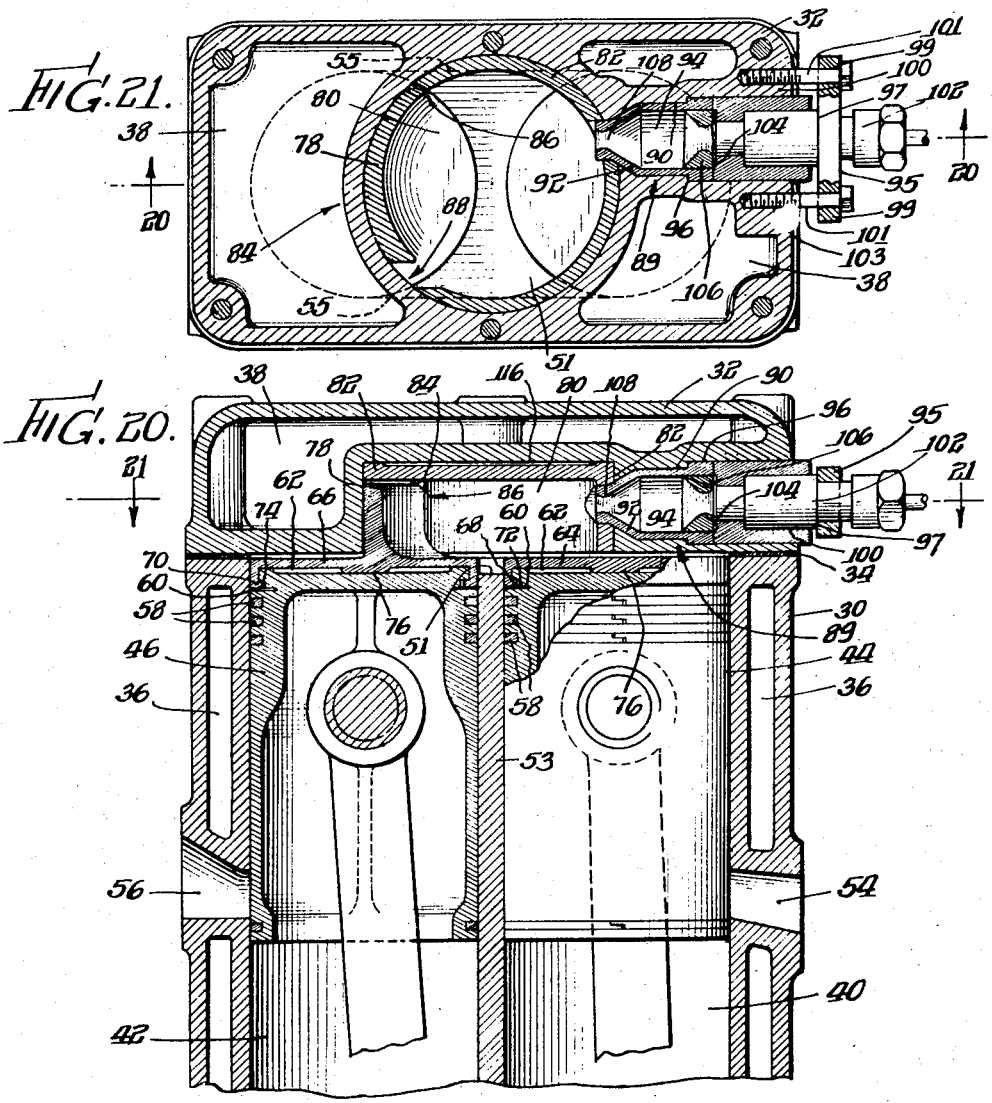

Patented June 15, 1948

2,443,502

UNITED STATES PATENT OFFICE 2,443,502

ENGINE CONSTRUCTION

Constantine N. Guerasimoff, Harvey, Ill.

Application February 8, 1941, Serial No. 378,048

2 Claims. (Cl. 123—32)

This invention relates to internal combustion engines. More particularly, it relates to improvements in structure in internal combustion engines.

Internal combustion engines have been constantly improved in design, especially in recent years, but despite this it is well recognized that they are far from perfect even yet. For example, particularly in the case of engines of the direct injection type, in which the fuel is injected directly into the combustion chamber without being first volatilized and mixed with air, the problem of providing means for bringing about the necessary mixing of the fuel and air uniformly and rapidly and the promotion of burning in a uniform manner is far from being solved, although various expedients have been proposed for overcoming the difficulties in part.

It is, therefore, an object of this invention to provide internal combustion engines of the direct injection type having an improved design as respects the volatilization, mixing and distribution of fuel and the promotion of uniform and complete combustion thereof.

Another object is to provide improved means for causing turbulence in the combustion chamber of internal combustion engines of the direct injection type.

A further object is to provide an internal combustion engine of the type in which fuel is injected under high pressure into the combustion chamber without prior mixing with air, which engine includes cooperating means operating respectively during scavenging, compression and at the time of ignition, to bring about controlled acceleration of turbulence, including, among said means, means for producing counterflow turbulation.

A still further object is to provide a U-type compression ignition internal combustion engine in which fuel is directly injected under pressure, which engine includes cooperating means operating respectively during scavenging, compression and at the time of ignition, to bring about controlled acceleration of turbulence, including, among said means, means for producing counterflow turbulation.

A more specific object is to provide an internal combustion engine of the direct injection type, which includes means operative during compression for producing a controlled acceleration of turbulence within the combustion space.

A still more specific object is to provide a U-type compression ignition engine having direct fuel injection, which includes means operating respectively during scavenging and compression to bring about controlled acceleration of turbulence.

Still another object is to provide means for producing turbulence of a predetermined type in the combustion space of internal combustion engines.

Another object is to provide an internal combustion engine of the direct injection type having means for producing counterflow turbulation in the combustion chamber.

A still further object is to provide means in an internal combustion engine of the direct injection type for accomplishing the most advantageous combustion of the fuel injected therein.

Another object is to provide heat insulating means for insulating the ring belt of the piston in an internal combustion engine from the combustion chamber.

Still another object is to provide a piston for an internal combustion engine having heat insulating means on the inner end for decreasing the quantity of heat reaching the ring belt of the piston and retaining the heat in the combustion space.

A further object is to provide means for retaining heat in the combustion space of internal combustion engines of the compression ignition type to improve fuel economy and to prevent carbon formation or crank-case dilution.

Other objects will appear hereinafter.

It has now been found that these objects may be accomplished by constructing internal combustion engines as illustrated in the accompanying drawings which form a part of this specification and in which Figure 1 is a partial vertical section on the line 1—1 in Figure 2, through a two-stroke cycle, U-type, compression ignition, internal combustion engine embodying features of the present invention and showing the pistons approaching and substantially at the lower limit of the'r power stroke;

Figure 2 is a top plan view of the enrine as shown in Figure 1, with a portion broken away to show a horizontal section on the line 2—2 in Figure 1;

Figure 3 is a partial vertical section, similar to Figure 1, on the line 3—3 in Figure 4, showing the same engine as the pistons are approaching and substantially at the upper limit of their stroke;

Figure 4 is a top plan view of the engine as shown in Figure 3, with a portion broken away to show a horizontal section on the line 4—4 in Figure 3;

Figure 5 is a vertical section, similar to Figure 1, on the line 5—5 in Figure 6, showing the same engine with the pistons substantially at the upper limit of their compression stroke and substantially at the instant when combustion is initiated in the turbulator;

Figure 6 is a top plan view of the engine as shown in Figure 5, with a portion broken away to show a horizontal section on the line 6—6 in Figure 5;

Figure 7 is a partial vertical section, similar to Figure 1, on the line 7—7 in Figure 8, showing the same engine just after the pistons have passed the upper limit of their compression stroke and are starting downward on the power stroke;

Figure 8 is a top plan view of the engine as shown in Figure 7, with a portion broken away to show a section on the line 8—8 in Figure 7;

Figure 9 is a partial vertical section on the line 9—9 in Figure 10, through a two-stroke cycle, U-type, compression ignition, internal combustion engine embodying features of the present invention but having an alternative construction;

Figure 10 is a top plan view of the engine as shown in Figure 9;

Figure 11 is a partial vertical section, similar to Figure 9, on the line 11—11 in Figure 12, showing the same engine with the pistons in a different position;

Figure 12 is a top plan view of the engine as shown in Figure 11;

Figure 13 is a partial vertical section on the line 13—13 in Figure 14, through the upper portion of still another form of two-stroke cycle, U-type, compression ignition, internal combustion engine embodying features of the present invention;

Figure 14 is a partial horizontal section on the line 14—14 in Figure 13;

Figure 15 is a partial vertical section on the line 15—15 in Figure 14;

Figure 16 is a partial vertical section on the line 16—16 in Figure 17, showing a four-stroke cycle, compression ignition, internal combustion engine embodying features of the present invention;

Figure 17 is a partial horizontal section on the line 17—17 in Figure 16;

Figure 20 is a partial, enlarged, vertical section through the engine shown in Figures 1 to 8, inclusive, on the line 20—20 in Figure 21, showing in greater detail certain features of construction; and Figure 21 is a partial horizontal section on the line 21—21 in Figure 20.

Figure 18:
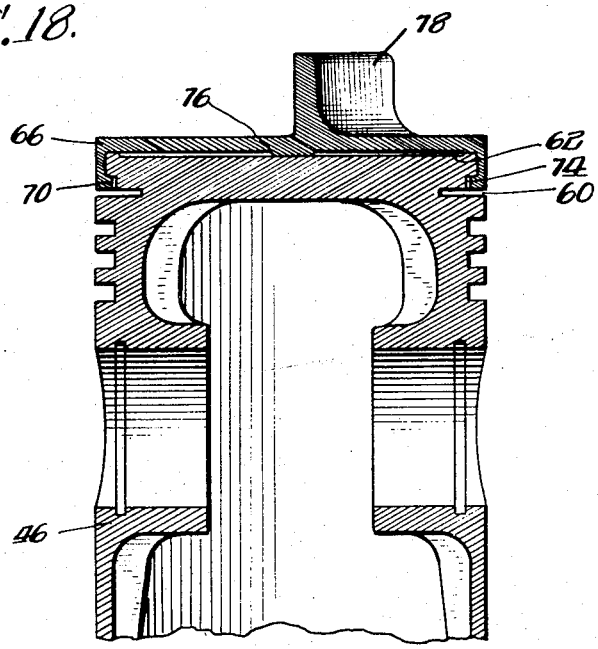
Figure 18 is an enlarged, detailed, vertical section on the line 18—18 in Figure 19, through one of the pistons in the engine as shown in Figures 1 to 8, inclusive.

Referring now more particularly to Figures 1 to 8, inclusive, and 18 to 21, inclusive, it will be seen that a two-stroke cycle U-type, compression ignition, internal combustion engine is shown, which includes a cylinder block 30 and a head 32 bolted thereon, with a gasket 34 therebetween. The usual passages 36 and 38 are provided, respectively, in the block and head for circulation of liquid cooling medium. As in the conventional two-stroke cycle, U-type engine, the block is provided with a pair of adjacent bores 40 and 42 in which a pair of pistons 44 and 46, respectively, reciprocate. These pistons are connected in the conventional manner by connecting rod structure 48 to a crank shaft (not shown) which fits into the opening 50. The dot-dash circle 52 in the lower portion of the figures shows the path of movement of the connecting rod structure 48, the arrow indicating the direction thereof. 54 designates the intake ports and 56 the exhaust ports.

As is shown by the detail in Figures 5, 18 and 20, pistons 44 and 46 are both provided with the usual sealing rings 58. In order to minimize the transfer of heat to the piston ring belt, with resultant loss in heat from the combustion space and resultant break-down of lubricating oil in the region of the rings 58 due to possible overheating, the upper portions of both pistons 44 and 46 are provided with heat insulating means. These include an annular slot 60 and insulating spaces 62. Insulating spaces 62 may be simply air spaces or may be layers of asbestos, mica or other types of heat insulating material, as the conditions of operation for which the engine is designed may require.

Insulating means 62 are made possible by the provision of caps 64 and 66, which are shrunk onto the heads of pistons 44 and 46, respectively. Caps 64 and 66 are respectively secured to the piston by annular inturned portions 68 and 70 which are shrunk into the annular grooves 72 and 74 located immediately above the annular slots 60. In order to provide spaces 62 depressed areas are provided on either the inner face of caps 64 and 66 or on the opposed upper face of the piston, or both, as desired.

Figure 19:
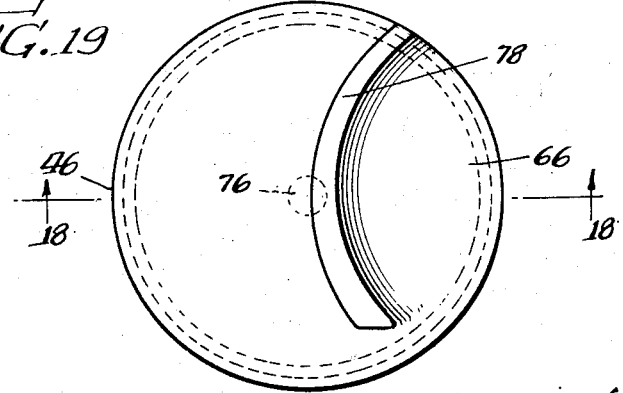
Figure 19 is a top plan view of the piston as shown in Figure 18.

As illustrated in Figure 18, the depressed area is provided on the opposed face of the piston, the cap 66 resting on the annular ridge remaining around the outer edge of the upper face of the piston. To give added strength to the cap a centrally located, downwardly extending projection 76 is provided which rests against the upper face of the piston. The circular dotted line in Figure 19 shows the general shape of the depressed area provided on the upper face of the piston beneath the cap 66. Cap 64 is constructed similarly in this respect to cap 66, and the upper face of the piston 44 includes a similarly depressed area.

As described above, the caps 64 and 66 are generally similar but there is an important difference between them. Whereas, the upper surface of cap 64 is flat and smooth, cap 66 is provided with an upwardly extending curved portion 78. Centrally located above the two bores 40 and 42 in the head 32 is a combustion chamber 80. In order to minimize heat loss in this combustion chamber, the top and a portion of the sides thereof are provided with heat insulating material 82. As is best indicated in the plan views of Figures 2, 4, 6 and 8, the insulating material 82 extends only part way around the sides of the chamber 80, leaving a space 84 not covered with insulation.

It will be noted that the upwardly extending portion 78 on piston cap 66 corresponds generally in horizontal cross-section with the portion of insulation 82 omitted to provide space 84 and is positioned so that it projects into this space when piston 46 is at the top of its stroke.

Projection 78 is proportioned and positioned so as to provide a very close clearance at 86 on one end thereof and between it and the adjacent wall of combustion chamber 80, and so as to provide a substantial open space at 88 on the other end.

It will be noted that portion 78 gradually increases in thickness in a horizontal direction from the end where opening 86 is provided to the end where opening 88 is provided, for a purpose to be hereinafter described.

Adjacent the combustion chamber 80 in head 32 is a counterflow turbulator 89 of novel construction which cooperates with the combustion chamber 80, as hereinafter described. Turbulator 89, as may be seen, includes a hollow, generally cylindrical insert 92 fitting within the inner portion of an opening 90 in head 32. The clearance between insert 92 and the wall of opening 90 depends upon the power output for which the engine is designed. The hollow interior of insert 92 first decreases in cross-sectional area adjacent chamber 80, and then flares outwardly just as it opens into chamber 80 to provide a throat at 108. Insert 92 is driven into opening 90 and serves as insulation for the turbulator chamber 94 provided by its hollow interior. Shoulders, as at 96, on insert 92 rest against cooperating ledges provided in opening 90 to position the member 92. Further defining the interior configuration of chamber 94 is an annular insert 106 in turn driven into insert 92 and having its hollow interior shaped as shown in the drawings. A plug 98 is driven into opening 90 behind insert 92 and with one end abutting the outer end of insert 92. The inner end of plug 98 is dished out, as at 104, so as to minimize the area of contact between the metal of turbulator 89 surrounding chamber 94 (which becomes quite hot as hereinafter disclosed) and the metal of plug 98 which surrounds the injector 102. The purpose in so minimizing the area of contact is to minimize heat flow from chamber 94 to the injector 102.

The high pressure fuel injector 102, which is of conventional construction, is positioned in an opening 100 in plug 98. Opening 100 extends through plug 98 and is proportioned so that the inner end of injector 102 is just flush with the surface of plug 98 in the dished out portion 104. Opening 100, through which fuel injector 102 extends, is positioned so that injector 102 is centered with respect to chamber 94 and is alined with the opening 108 connecting chamber 94 and combustion chamber 80. The result of this arrangement is that the major portion of the stream of fuel discharged by injector 102 passes straight through turbulator 89 and is injected through opening 108 into chamber 80.

The tubulator chamber 94 is designed as shown to produce conditions therein such that the entire volume of air in the turbulator 89 will be involved in the combustion process and to eliminate dead spaces where carbon is likely to be formed, such as corners or sharp angles. The annular member 106 serves this purpose, for example. At the other end of turbulator 89 adjacent throat 108 the same result is accomplished by gradually decreasing the diameter of chamber 94 down to the minimum diameter of throat 108. Throat 108, providing a restricted means of communication between chamber 94 and chamber 80, serves a purpose which will become apparent hereinafter.

The whole assembly, including injector 102, plug 98, and insert 92 in which annular insert 106 is positioned, is secured in position as described by a bar 95 which may be formed integrally with injector 102 or which may be a separate part having a central aperture so that it may be positioned on the injector 102, as shown, and rest against shoulders formed on injector 102 as at 97. Whether bar 95 is integral with the injector 102 or whether it fits down against shoulders, as at 97, it is designed to secure the assembly as aforesaid in position. For this purpose the bar is apertured adjacent either end as at 99, to receive fastener units, such as bolts 101, which are turned into threaded openings 103 in the head 32. The inwardly directed force exerted by bar 95 on injector 102 when bolts 101 are drawn up tight serves to hold the whole assembly, including injector 102, plug 98, and insert 92, firmly in place. It will be apparent that other fasteners than bolts 101, as well as other securing means than bar 95, may be used if desired. Thus, the fasteners can be formed integral with head 32 and threaded on their outer ends which project through apertures 99, nuts, such as wing nuts, being threaded thereon and drawn up tightly against the outer face of bar 95.

It will be noted that the turbulator 89 and the injector 102 are positioned so that fuel injected into chamber 80 enters chamber 80 in a substantially horizontal direction at a point slightly above the middle vertically of chamber 80. Viewed in plan, however, the path of the fuel into chamber 80 is not central but is roughly tangential with respect to the vertical walls of chamber 80.

The exhaust ports 56, the horizontal cross-section of which is clearly shown in Figures 2 and 20, are, as will be noted, of conventional construction. Intake ports 54, on the other hand, are arranged so that the gases entering the cylinder 40 are moving in a direction tangential to the vertical walls of cylinder 40. Also, as can be readily seen in Figures 20 and 21, the top 51 of the dividing wall portion 53 of block 30 defined by the sides of bores 40 and 42 and by a pair of lines 55 parallel to a line connecting the centers of the two bores 40 and 42, each of which lines 55 is tangent to both bores, is dropped to increase the cross-sectional area of the combustion space between the two bores and to thereby increase the air flow during scavenging.

Having now described in detail the construction of the engine shown in Figures 1 to 8, inclusive, and 18 to 21, inclusive, the invention will be better understood from a description of the operation of the engine. As will become more apparent hereinafter, the engine shown in these particular figures includes a novel counterflow turbulator and is designed to produce controlled acceleration of turbulence in the combustion space. This acceleration of turbulence is produced in three stages, as described hereinafter.

Figure 1, as stated above, shows the pistons approaching and substantially at bottom dead center. As can be seen, the upper side of piston 46 has already moved down below the exhaust ports 56 so that they are now wide open, and piston 44 has moved down to a point where intake ports 54 are partly open. The dotted line at 110 shows the path taken by the air which is forced into the combustion space above piston 44 under a gauge pressure of preferably about three to seven pounds. Pressures in this range produce good scavenging in two-stroke cycle engines, although other pressures may be used, depending on the speed at which the engine is to be operated or the power desired. Since, as pointed out above, intake ports 54 are located and arranged so as to direct this air in a generally tangential direction, the air will swirl around upwardly through the space above piston 44, thence around in the combustion chamber 80 and across the lowered top 51 of dividing wall 53, and will swirl downwardly and out through exhaust ports 56, scavenging the products of the previous combustion stroke from the combustion space and at the same time filling it with air for the succeeding compression stroke.

Proceeding now to Figure 3, the pistons have moved past the bottom limit of their stroke and have continued upwardly on the compression stroke to the position shown in this figure. The compression stroke has not quite proceeded to the point where the injection of fuel takes place. Figure 3 is included for the particular purpose of showing the function of the projection 78 on piston cap 66.

As will be apparent from the description above of the construction of projection 78 and its relation to combustion chamber 80, as the upper edge of projection 78 enters combustion chamber 80, it traps air behind it in the space 112. As the piston 46 continues upwardly this air is compressed more than the air in the remainder of the combustion space and tends to seek an outlet from the space 112 where it is trapped. Because of the close fit between the outer circumference of projection 78 and the wall of the combustion chamber 80, as well as the close fit between the end of projection 78 at 86 and the adjacent insulation 82, the only space remaining through which a substantial amount of the trapped air may escape from space 112 into the combustion space is that provided at 88. The sides of this space 88, as will be noted, are arranged to direct the air into combustion space 80 also in a direction generally tangential to the side walls of the combustion space. This causes the air to follow a circular path, as indicated by the arrow and dotted line 114. In order to maintain the swirling motion of the air in chamber 80 and later on of the fuel, and to prevent interference with air passing through the space 88, the projection 78 is made of greater thickness adjacent space 88, as described above. By way of example, it is pointed out that the close fit referred to above, as between the projection 78 and the wall of combustion chamber 80, and between projection 78 and insulation 82 at 86, is one involving a clearance of the order of a few thousandths.

The second step in the production of turbulence within the combustion space has now been described, the first being the tangential admission of air into the combustion space, as shown in Figure 1. It will be seen that the second stage in the promotion of turbulence is arranged to cooperate with the first and continue to accelerate the swirling motion of the air produced by the first, as is indicated particularly by the direction of the arrows in Figures 2 and 4, and that the turbulence and its acceleration are controlled by the progressive functioning of the various stages and by the design and cooperation. The third step is thus arranged to cooperate with the first two and give added impetus to the swirling motion producing the turbulence. The third impetus is provided by the counterflow turbulator 89.

After the pistons have progressed upwardly on the compression stroke to the proper point, fuel is injected as shown in Figures 5 and 6. During the compression stroke it will be apparent that the pressure in combustion chamber 80 will rise above that in turbulator 89 due to the restricted communication between chamber 80 and chamber 94 through throat 108, so that air will be forced from chamber 80 through the opening 108 into the chamber 94 of the turbulator 89 continuously during the rest of the compression stroke or until the pressure in chamber 94 rises due to combustion therein. Before the air pressure in chambers 80 and 94 can be equalized by this flow, injection of fuel takes place.

The cross-section of the stream of fuel from the injector 102 shows a central portion, including most of the injected fuel, surrounded by an envelope of relatively finely divided particles. As described above, the fuel is injected through chamber 94 and through opening 108 into chamber 80 and thus passes through opening 108 in a direction counter to that of the air under pressure which is still entering chamber 94 from chamber 80. As a result of these opposed movements of air and fuel, the air tends to strip from the jet of fuel the finely divided particles and to carry them back from opening 108 into chamber 94 to retain them within the chamber 94, the main portion of the jet of fuel being injected into chamber 80, however. Furthermore, since the stripped portion of the fuel is in the most finely divided and volatile state and is thus most readily ignitable, ignition starts within the chamber 94 in turbulator 89, as shown in Figures 5 and 6. As a result of the starting of ignition within the chamber 94, pressure in this chamber quickly rises above that in chamber 80 so that the contents of chamber 94 then discharge into the chamber 80. By way of explanation, it may be pointed out that the excess of the pressure in turbulator 89 over that in chamber 80 may rise to approximately 400 to 600 pounds per square inch or even higher, although the invention is not intended to be limited in this respect. Because of the arrangement of jet 102 and turbulator 89 to exhaust into chamber 80 in a tangential direction, this discharge produces the third impetus to the swirling motion of the air in chamber 80, adding still further to the turbulence therein.

Considering the third stage more in detail, it is seen that a rapid movement of the compressed air in the combustion space in a fairly well defined direction is in progress along with a movement of the compressed air from chamber 80 through opening 108 into turbulator 89 at the time that the fuel is injected by injector 102 through turbulator 89 into chamber 80. As described above, the volatile portion of the fuel jet is largely stripped by the compressed air streaming in a direction opposed to the fuel jet through opening 108 so that this stripped fuel does not reach chamber 80 but is retained in chamber 94 and, being the most readily ignitable portion of the jet, it ignites in chamber 94 before ignition takes place in chamber 80.

The resulting rise in pressure in chamber 94 then reverses the flow through throat 108 and causes a discharge of the contents of chamber 94 into chamber 80. This takes place while the injection of fuel into chamber 80 is still going on and, since the discharge through throat 108 into chamber 80 is tangential in a direction concurrent with the movement already in progress in chamber 80, the movement is still further accelerated. It is already well known in the art that a maximum of controlled turbulence within the combustion space is highly desirable, and it will therefore be apparent readily from the foregoing that the turbulence in the combustion space 80 produced as described herein makes for very rapid atomization of the fuel and mixing of it with the air to provide a highly combustible mixture. In addition, however, the gaseous material discharged into chamber 80 from turbulator 89 is already in the process of burning so that the flame travel in chamber 80 is increased greatly over that resulting simply from normal flame propagation in quiescent air. The rapid travel of the burning gases, plus the high state of controlled turbulence, mixes the ignited and unignited gases very rapidly. Consequently, the combustion of the fuel takes place much more rapidly and at the same time more completely, thereby providing not only greater fuel economy but permitting higher speeds of operation as well, along with increased power output.

In the light of the foregoing description of the construction and function of counterflow turbulator 89, it will be clear that there are practical limits within which the capacity of turbulator 89 relative to that of combustion chamber 80 should be kept for best results. The preferred relation exists when the volume of turbulator 89 is about fourteen per cent to about sixteen per cent or around fifteen per cent of that of the combustion space when pistons 44 and 46 are at the extreme upper limit of their stroke. The combustion space includes the space in turbulator 89, as well as that in combustion chamber 80. The volume of turbulator 89 is not limited to the above percentage, however. It may, for example, vary from about seven per cent to thirty per cent of the combustion space, when pistons 44 and 46 are at the extreme upper limit of their stroke, or even higher and lower, depending upon a variety of considerations.

Since compression ignition engines depend upon the heat developed in the combustion chamber to bring about the ignition of the fuel injected, retention of heat within the chamber is desirable, particularly in medium output engines. To this end, in addition to providing insulation 82, the combustion chamber may be further insulated by providing spaces, such as 116, between the insulation 82 on the top of combustion chamber 80 and the adjacent wall of the cylinder head 32. These spaces may be provided, as was true of those beneath the piston caps, by dishing out the wall of the cylinder head or the opposed face of the insulating material 82, or both. They may simply be air spaces or they may be filled with insulating material such as asbestos, mica or any other suitable heat insulator.

The engine shown in Figures 1 to 8, inclusive, is designed to run at high speeds with high specific output and with a clean exhaust. By "high specific output" is meant power output divided by the cubic inches of displacement, and by "high speed" is meant from about 1800 R. P. M. up, 1200 to 1500 R. P. M. being considered medium speed. As a matter of fact, speeds as high as 2500 R. P. M., with the three stage turbulation feature embodied in the engine shown in Figures 1 to 8, may be used.

For industrial applications where only moderate speeds are required, but where exceptionally good fuel economy is desired, adequate turbulence can be obtained by employing only two stages of turbulation. Such an engine is shown in Figures 9, 10, 11 and 12. As will be apparent from the description of this engine, it is also of the direct injection compression ignition type and embodies means for producing and accelerating the turbulence, including a combination of tangential admission of air with a further impetus to the swirling motion given by a projection on top of one of the pistons. A turbulator, such as counterflow turbulator 89 shown in Figures 1 to 8 is not employed.

The structure of the engine shown in Figures 9 to 12, inclusive, is generally similar to that in Figures 1 to 8, including a block 118 and a head 120 bolted together with a gasket 122 therebetween. Passages 124 in the block 118 and passage 126 in the head 120 are provided for cooling medium. This engine is also of the U-type and includes a pair of adjacent bores 128 and 130 in which a pair of pistons 132 and 134, respectively, reciprocate. These pistons, like those in the engine of Figures 1 to 8, are connected to a crankshaft (not shown) by a conventional connecting rod arrangement 136.

Intake ports 138 are constructed in the same manner as ports 54 to provide for tangential admission of air, and exhaust ports 140 are of conventional construction, as described above for ports 56. Pistons 132 and 134 are, respectively, identical in construction with pistons 44 and 46, being provided, respectively, with shrunk-on caps 142 and 144, respectively identical with caps 64 and 66, projection 146 corresponding to projection 78. Projection 146 is arranged to extend upwardly at the top of the stroke of piston 134 into a combustion chamber 148 provided with insulation 150 similar to insulation 82, and having an open space 149 therein to receive the projection 146. This insulation 150 is also arranged with the side walls of the head 120 to provide insulating spaces 151 which may be air spaces or may include suitable heat insulating material. The conventional fuel injector 152 is mounted in the usual way in a thickened portion 147 of head 120 and extends directly into the combustion chamber centrally of the top. In this engine, as in that of Figures 1 to 8, the top 153 of the dividing wall portion 155 of block 118 between bores 128 and 130 is dropped to increase the cross-sectional area between the two bores and thus provide for greater air flow during scavenging.

The operation of this engine will be apparent from the description of the engine shown in Figures 1 to 8. Air admitted tangentially through intake ports 138 swirls upwardly above cylinder 132, thence through the combustion chamber 148 over the top 153 of dividing wall portion 155, downwardly above cylinder 134, and out through the exhaust port 140, scavenging the engine and producing the first stage of turbulation. During the compression stroke the projection 146, through the medium of air trapped in the space 154, further accelerates the turbulence, as described in connection with Figures 1 to 8. Accordingly, when the fuel is injected into the chamber by injector 152, sufficient turbulence is provided so that excellent fuel economy can be obtained for moderate speed operation.

It will be noted that, as shown in Figures 1 to 12, combustion chambers 80 and 148, and also turbulator chamber 94, are heat insulated. The engine shown in Figures 13 to 15, inclusive, does not include any such heat insulated chambers since the cylinder head and piston head are designed for high speed and very high output which are accompanied by a very high rate of heat formation. Where heat insulating materials interfere too much with heat dissipation, this high rate of heat formation tends to produce such excessive temperatures that the metal is burned, cracked, or otherwise disintegrated, and therefore the use of insulated chambers, as in the engines of Figures 1 to 12, is not desirable in the engine of Figures 13 to 15. The air trapping projection on one of the pistons (such as projections 78 and 146 in Figures 1 to 12) is also omitted from the design of the engine in Figures 13 to 15, since there is a danger that the excessive temperatures that may be encountered would destroy it. Thus, in this engine also only two stages of turbulation are employed, but the piston projection is omitted instead of omitting the counterflow turbulator as in the engine of Figures 9 to 12, inclusive. Thus, the two stages of turbulation in Figures 13 to 15 are tangential admission of air and counterflow turbulation. In engines of very high output, where the rate of heat formation is very great, it may not only become necessary to do away with heat insulation in the main combustion chamber but may sometimes be desirable to resort to the use of metals having high coefficients of heat transfer, such as aluminum or copper, in order to maintain proper cylinder head operating temperatures.

As may be seen, the engine in Figures 13 to 15 is also a two-stroke cycle, U-type, compression ignition engine and thus is generally similar to that shown in Figures 1 to 12, inclusive. For this reason only the upper portion of the engine is illustrated since it is in this portion that the construction differs. It will be noted that the arrangement of the injector and counterflow turbulator chamber is different in some respects from that shown in Figures 1 to 8, but it should be understood that these arrangements are merely alternatives and that either may be used in either form of engine.

The engine shown in Figures 13 to 15 include a cylinder block 156 and a head 158 bolted together in the usual manner, with a gasket 160 therebetween, the usual passages 162 and 164 being provided for cooling medium. The engine, being of the U-type, includes a pair of adjacent bores 166 and 168, in which pistons 170 and 172, respectively, reciprocate. Both pistons 170 and 172 are identical in construction with piston 44, including annular ring insulating slots 174 and caps 176 shrunk thereon, with insulating spaces 178 provided between the caps 176 and the respective pistons. The spaces 178, as in the case of other pistons, may be air spaces or may contain insulating material, such as asbestos, mica or other heat insulators.

Whereas, as pointed out above, in this engine, which is designed for high output and high speed, because excessive temperatures may be encountered, no heat insulation is provided around the turbulator chamber and the combustion chamber, for the same reason the insulation is retained on the piston head and assumes an even greater importance. The distinction is obvious since the insulation on the chambers is between the source of heat therein and the cooling medium to which it is desirable for the heat to pass so that it is harmlessly dissipated while, on the other hand, the insulation on the piston head is between the source of heat and the piston ring belt. It is not desirable for heat to pass to the piston ring belt at any time since the lubricating oil working up the cylinder walls to lubricate them gets up to the piston ring belt and since the latter, if at too high a temperature, tends to carbonize and otherwise break down the oil, causing not only ring sticking but also loss of the lubricating properties of the oil. This, then, explains why the piston heads are insulated with caps such as 176, slots such as 174, and spaces such as 178, even though insulation is omitted from the combustion chamber and the turbulator chamber.

The usual combustion chamber 180 is centrally located in the head 158 over the adjacent bores 166 and 168. Head 158 is further provided with an integral extension 182 in which the fuel injector 184 of conventional design and the counterflow turbulator 186 are located. Cooperating with extension 182 on head 158 is a corresponding integral extension 188 on cylinder block 156 which aids in supporting extension 182 and also in cooling it, the cooling medium passage 162 being extended in extension 188 beneath extension 182, as at 190. Passage 164 in head 158 also is continued into extension 182 over turbulator chamber 186 as at 192. This turbulator 186 is a vertically extending cylindrical opening in extension 182, with the sides merging with the top as at 194 to provide a dome-shaped configuration. A horizontally extending, generally cylindrical opening 196, located in extension 182 and communicating with chamber 186, is provided to receive the fuel injector 184. It is positioned so that injector 184 will inject fuel through chamber 186 directly into chamber 180 in a horizontal direction generally tangential to the adjacent side walls of chambers 186 and 180 and preferably near the middle vertically of chambers 186 and 180. Opening 196 is of a size such that injector 184 just fits snugly therein. Injector 184 is reduced in diameter adjacent the inner end thereof to provide an annular shoulder 198 and opening 196 is correspondingly reduced in diameter to provide a cooperating annular shoulder 200 against which shoulder 198 rests. Shoulder 200, which serves to position injector 184 longitudinally of opening 196, is located so as to position injector 184 with respect to chamber 186 in the position clearly shown in Figure 14.

Injector 184 is secured in place as described, in a manner similar to that in which injector 102 is secured, by a bar 202 which may be formed integrally with injector 184 or which may be a separate part having a central aperture so that it may be positioned on the injector 184, as shown, and rest against an annular shoulder 204 on injector 184. Bar 202 is apertured adjacent either end, as at 206, to receive fastener units, such as bolts 208, which are turned into threaded openings 210 in extension 182, pulling bar 202 up tightly against shoulder 204 whereby to secure injector 184 in opening 196. It will be apparent, of course, that, as in the case of injector 102, other means for securing injector 184 in place may be employed.

As was pointed out above, injector 184 is arranged to inject fuel straight through chamber 186 into chamber 180, an opening or throat 212 connecting chambers 180 and 186 being provided for this purpose. It will be observed that injection through the counterflow turbulator chamber directly into the combustion chamber in a direction tangential to the adjacent side wall thereof is a feature common to all forms of the counterflow turbulator. Turbulator 186 is unique in some respects, as described above. One important feature is that the fuel passes through chamber 186 in a direction tangential to the adjacent side walls, and air entering chamber 186 from chamber 180 also enters in a direction tangential to the adjacent side wall. The purpose of the tangential arrangement of chamber 186 is to increase the turbulence therein to produce more rapid mixing of the contents of the chamber. The use of this arrangement is not peculiar to the particular type of engine shown in Figures 13, 14 and 15. It may be employed with the other types of engines, including those disclosed herein. Similarly, a turbulator arranged like the turbulator in Figures 1 to 8 may be used in the engine of Figures 13, 14 and 15. It will be observed that opening 212 is arranged to provide a gradually tapering path for the passage of the injected fuel narrowing as it approaches chamber 180. This tends to promote the stripping of the fine spray.

It is believed that the operation of this engine will also be apparent from what has been described above. Near the end of the power stroke the pistons pass below the openings communicating, respectively, with the intake and exhaust ports, whereby the engine is scavenged and is filled with air for the compression stroke. Although the lower portion of the engine is not shown in Figures 13 to 15, inclusive, tangential admission of air is provided for to produce the first stage of turbulation. In this, as in the other U-type engines described herein, the top 216 of the center dividing wall 214 between the bores 166 and 168 is dropped between a pair of tangents, the location of which is indicated by dotted lines 218 and 220, in order to increase the cross-sectional area of the combustion space between bores 166 and 168 and facilitate scavenging.

The second and final stage in this engine is provided by the counterflow turbulator 186. As in the engine shown in Figures 1 to 8, the fuel is injected through the turbulator 186 into the combustion chamber 180 while air under pressure is being forced from chamber 180 through opening 212 into counterflow turbulator 186. This flow of air results, obviously, from the rapid rise in pressure in chamber 180, coupled with the restricted opening 212 through which air passes into turbulator 186 to equalize the pressure. The compressed air which moves into turbulator 186 entering in a direction tangential to the adjacent side wall tends to set up a swirling motion of the contents of turbulator 186 in a counterclockwise direction. This occurs prior to fuel injection through turbulator 186 and the swirling motion is thus well established when injection starts. This is important because, although the fuel also enters turbulator 186 tangentially, it is moved in a direction which tends to cause swirling in a clockwise direction or, in other words, in a direction opposite to that of the swirling produced by the air entering chamber 186 through opening 212. This arrangement thus provides a maximum of turbulence within the counterflow turbulator 186 itself, still further contributing to the more rapid initiation of combustion therein. This in turn causes the discharge into chamber 180 to occur more quickly after the air reaches a state of compression sufficient to raise the gases to ignition temperature and also causes the discharge to rise to a maximum more rapidly.

As described above, the air rushing into turbulator 186 through opening 212 strips from the fuel jet passing through turbulator 186 and opening 212 finely divided fuel particles which are the more readily ignitable portion of the jet. Ignition is thus initiated first in turbulator 186, causing the pressure in that chamber to rise rapidly to a point where it greatly exceeds the pressure in chamber 180, as described above with respect to Figures 1 to 8. This causes a reversal of gas flow through opening 212, gases then being forced from turbulator 186 into chamber 180 which they enter tangentially in a direction concurrent with the direction of flow of the air produced by the tangential admission thereof through the intake port. The discharge from counterflow turbulator 186 into combustion chamber 180 produces the same results outlined above in describing the operation of counterflow turbulator 89 in Figures 1 to 8, the relative capacities of the combustion space and chamber 186 being capable of varying as also described above in connection with turbulator 89, and the preferences expressed above also applying to this engine. The discharge from turbulator 186 into chamber 180, as a result of the initiation of combustion in chamber 186, takes place while injection of fuel through chamber 186 into chamber 180 is still in progress. The increased turbulence produced during the actual injection of fuel causes the latter to atomize and mix with the air very rapidly and, since the material discharged from turbulator 186 into chamber 180 is already burning, it tends with the turbulence to bring about a much more rapid flame travel than that produced by normal flame propagation in quiescent air. Both more rapid and more complete combustion result in making possible among other things improved fuel economy and higher speeds of operation.

Figures 16 and 17 illustrate the application of the invention to a four-stroke cycle, compression ignition engine. As in Figures 13 to 15, only the portion of the engine adjacent the combustion space is shown since otherwise its design is not restricted, so far as this invention is concerned. It is to be noted that in this engine, as shown, only one stage of acceleration of turbulence is employed, namely, the counterflow turbulator.

At least one other stage may be employed, if desired, namely, the air trapping projection on top of the piston (such as projection 78) but not so readily as in the U-type engines. In the U-type engines the cylinders are located so that the combustion chamber extends over only a portion of the area of each so that by providing a projection, such as 78, extending across the top of the piston except for the small outlet at 88, and fitting closely against the wall of the combustion chamber when the piston is adjacent the top of its stroke, a trap 112 surrounded by the walls of the bore, the piston top, the projection and the cylinder head, is provided from which the air can only escape through the outlet 88. In the engine of Figures 16 and 17 it will be apparent that, due to the relative sizes and locations of the cylinder and combustion chamber, a slightly different form of projection is required, although the principle of operation is the same. Thus, a projection on the piston in Figures 16 and 17 would need to extend around substantially the whole periphery of the combustion chamber to provide a trap.

The structure of the engine shown in Figures 16 and 17 includes the usual cylinder block 222 and a cylinder head 224 bolted thereto with the usual gasket 226 therebetween. A piston 228 works in a bore 230 in block 222 in the usual manner. Passages 232 and 234 in block 222 and head 224, respectively, are provided for the circulation of cooling medium.

Piston 228 is linked in the customary way by a connecting rod 236 to a crank-shaft (not shown), and is provided with the usual sealing rings 238, but in other respects differs materially from pistons now in use, being identical in construction with piston 44, for example, described above. Thus, it is provided with a shrunk-on cap 240 identical with cap 64, beneath, which a heat insulating space 242 is provided, which, like space 62, may be an air space or may be filled with suitable heat insulating material. The annular slot 244 corresponds to slot 60 on piston 44, serving to minimize heat transfer from the combustion chamber to the portion of the piston where sealing rings 238 are located. The rod section 245 is a portion of one of the conventional cam-controlled valve push rods.

An air inlet valve 246 in head 224 controls communication between the combustion chamber 248 of the usual type and the inlet air passage 250. The combustion chamber 248, although located over the cylinder 230, is somewhat smaller in diameter than cylinder 230 and thus there is sufficient space so that exhaust valve 252 may also be mounted over cylinder 230 at one side of chamber 248.

The portions of head 224 described up to this point are of an old and well-known design and are set forth merely as an illustration, there being no intent to limit the invention to them. A novel feature of head 224 is found, however, in counterflow turbulator 254. No detailed description of turbulator 254 is necessary here since it is identical with turbulator 89 in Figures 1 to 8, is mounted and secured in head 234 in the same way that turbulator 89 is mounted and secured, and is arranged, with respect to combustion chamber 248, to discharge into it in a direction tangential to the adjacent side wall thereof in the same manner that turbulator 89 discharges into chamber 80. The fuel injector 256, like the other fuel injectors shown herein, is of the usual construction and it too is positioned and secured in the same way that the fuel injector 102 is positioned and secured in Figures 1 to 8, inclusive. Thus, a heat insulating insert 258 of a hollow and generally cylindrical form fits tightly within an opening 260 in head 224 extending from the outside of the head 224 into chamber 248. An annular shoulder 262 on insert 258 rests against a cooperating ledge 264 in opening 260 to position member 258. An annular insert 266 is in turn driven into insert 258 to form with insert 258 the turbulator chamber 268. The latter communicates with chamber 248 through the throat 270 provided in insert 258, which throat 270 is alined with fuel injector 256 so that fuel is injected directly into chamber 248 through chamber 268. Plug 272 driven into opening 26 against insert 258 is provided with a central opening 274 to receive injector 256. The dished out formation at 276 on plug 272 is provided to minimize contact between insert 258 and plug 272. Cooperating shoulders 277 and 278 in opening 274 and on injector 256, respectively, serve to position the latter as shown. A bar 280 centrally apertured to receive injector 256 rests against shoulder 282 thereon and, on being drawn up tight by bolts 284 threaded into head 224, holds the entire assembly of injector and turbulator securely in place.

It is believed that the manner of operation of the engine shown in Figures 16 and 17 will be readily apparent from the foregoing description of its construction taken with the description of the operation of the other engines shown herein. Essentially, the only difference in operation between this and other four-stroke cycle, compression ignition engines occurs on the compression and power strokes, the operation during the intake and exhaust strokes being unchanged. As in the other engines shown during the compression stroke, air is forced through throat 270 from combustion chamber 248 into turbulator chamber 268. While this movement of air is still in progress, the fuel injection starts. Due to the arrangement of injector 256, turbulator 254 and throat 270, the main body of the injected fuel in the relatively dense core of the jet passes directly through chamber 268 and throat 270 into chamber 248. The fine spray surrounding the core is, however, stripped from the jet particularly by the air rushing into chamber 268 through throat 270 and is carried back into or retained in chamber 268. Being more finely divided than the core, this spray mixes much more readily with the air than does the core which passes into chamber 248 and thus the mixture in chamber 268 reaches a state of combustibility much sooner than does that in chamber 248. Ignition thus begins in chamber 268, raising the pressure therein and reversing the flow through throat 270, in many cases, at least, even before fuel injection is completed. The contents of chamber 268 then exhaust through throat 270 into chamber 248, producing and accelerating turbulence therein in a fairly well defined direction due to the arrangement of throat 270 to discharge into chamber 248 in a direction tangential to the adjacent side wall. The resulting turbulence not only promotes rapid atomization of the fuel and mixing of it with air, but also causes flame travel to very substantially exceed that produced by normal flame propagation in quiescent air. More rapid and complete burning of the whole body of fuel results, producing in turn improved fuel economy and permitting much higher speeds of operation.

A wide variety of forms of compression ignition engines have been described above. This variety of applications of the invention indicate its broad scope. Thus the invention is applicable generally to any kind of internal combustion engine in which the fuel is injected. By injection of fuel is meant the supplying of it to the combustion space without first atomizing or volatilizing it and mixing it with a gaseous source of oxygen, such as air. The engines disclosed in the drawings are designed primarily to burn a Diesel type fuel but the invention is nevertheless applicable to engines burning gasoline and designed to have the gasoline supplied by injection rather than carburetion. In applying the invention to gasoline engines, however, care must be taken to avoid pressures which are too high and to provide means to dissipate the heat produced, as will be apparent to those skilled in the art, particularly where the air trapping projection on the piston is employed as one stage of accelerating turbulence.

Control of the temperature conditions in the combustion space and adjacent thereto, as well as in the counterflow turbulator, goes far to improve the performance of any internal combustion engine, and is especially important in engines of the compression ignition type. Considerable attention has, therefore, been given to this factor in the engines disclosed herein. Thus, in the engines designed for medium output at either high or medium speed, it is desirable to reduce the heat loss in order to improve fuel economy and, therefore, in the engines of those types shown herein the walls of the combustion chamber, the head of the piston and the walls of the counterflow turbulator, where used, are provided with insulation. The temperature in the combustion space can be controlled to a great extent by variation of the size of the insulating spaces provided between the insulation on the walls of the combustion chamber and the cylinder head and underneath the cap on top of the piston, as well as by varying the heat insulating material employed in these spaces, such as air, asbestos, mica, et cetera. Among other results of controlling the temperature, a particularly important one is realized by maintaining the combustion chamber walls and counterflow turbulator walls (when used) at a temperature higher than the distillation end point of the fuel used. This prevents formation of carbon where the fuel strikes these walls because at such temperatures the fuel will vaporize quickly or else will not condense, and accordingly does not remain in a state where it fails to mix with sufficient oxygen to burn completely. It also prevents dilution of the crankcase lubricating oil by unburned fuel from the combustion chamber. The high wall temperatures maintain the fuel in a superheated state until the combustion is completed, so that complete combustion of the fuel is promoted. Still another advantageous result accruing from maintaining the walls with which the fuel comes in contact at such temperatures, whereby more complete combustion is promoted, is that ring sticking is minimized. Ring sticking results when fuel is allowed to come into contact with the relatively cold piston rings and form carbon and gum, and is minimized when the fuel is kept superheated and vaporized or atomized and is more completely burned, since under the latter conditions little or no unburned fuel remains after combustion and little or none can come into contact with the rings in the superheated state. Insulation also serves to improve the engine starting characteristics by reducing the rate of heat flow from the compressed air in the combustion space to the cooling medium either through the walls of the combustion chamber or through the piston.

Although one purpose of the cap shrunk on the piston head with a heat insulating space beneath it is to minimize heat loss and improve fuel economy, it has a further function, which is to lower the piston head temperature, at least in the piston ring belt and below. The whole piston head is, in fact, designed to lower the temperature in the piston ring belt. Oil from the crank-case working up the cylinder walls to lubricate them gets up into the piston ring belt. In most engines the temperature of this portion of the piston may normally reach 500° F. This, as is well known, is sufficient to break down and carbonize lubricating oils of the types now available commercially and, therefore, the lowering of the ring belt temperature tends to prevent sludging of the lubricating oil and carbon formation therefrom in the ring belt. The insulation to be used in the insulating space beneath the cap depends on various conditions, such as power output and general piston temperature conditions, and will be chosen in accordance therewith.

Although the cap shrunk on the piston head and providing a heat insulating space therebeneath, as well as the annular insulating slot, is shown in all of the engines illustrated in the drawings, the invention is not limited to this piston structure. Pistons lacking either or both of the features may be used in engines embodying other features disclosed herein without exceeding the scope of the invention. Such pistons are especially valuable, in connection with the other features disclosed herein for promoting combustion, especially in engines designed to take advantage of the higher speeds possible with the more rapid and complete combustion which may be obtained, since the rate of heat formation under such conditions makes the disadvantage of known pistons as regards ring belt temperature particularly acute.

The fact that either the air trapping piston projection or the counterflow turbulator may be used alone or may be combined with each other and/or with tangential admission of air to produce and accelerate turbulence to any desired degree is evident from the above description. Furthermore, the invention applies generally to two-stroke cycle engines having fuel injection so that it is not limited to the U-type engine shown.

Since those skilled in the art have long recognized that increased turbulence, particularly of a directed or controlled type, is highly desirable in engines in which the fuel is injected, the advantages of the means disclosed herein for producing and accelerating turbulence will be apparent to such persons at once. The air trapping piston projection, by putting the compressed air into a state of directed turbulence, greatly facilitates the atomization and mixing of the fuel with the air, and to some extent, at least, contributes to the production of more rapid flame travel. The counterflow turbulator also promotes atomization of the fuel and mixing of it with air and to an even greater extent increases the rate of flame travel over that of normal flame propagation in quiescent air due to the fact that it exerts its effect at the time when ignition is starting. The air trapping projection and counterflow turbulator, when used together, produce a still greater improvement, cooperating with each other and with tangential admission of air, if used, to produce an even more rapid and complete combustion.

It is apparent that many widely different embodiments of this invention may be made without departing from the spirit and scope thereof and, therefore, it is not intended to be limited except as indicated in the appended claims.

The invention is hereby claimed as follows:

1. In a U-type internal combustion engine the combination of a cylinder block having two cylinders side by side therein, pistons movable along said cylinders respectively, a combustion chamber at the ends of both cylinders and in communication with both with at least one of the cylinders having a portion extending transversely beyond the side face of the combustion chamber, a head closing the ends of the cylinders about said combustion chamber, and means comprising a plate on the end of the piston in said one cylinder shaped and positioned to cooperate effectively with the side wall of said combustion chamber when said piston approaches the end of its movement toward said head adapted substantially to close off temporarily from said combustion chamber that portion of the cylinder extending beyond the combustion chamber, said closing-off means being arranged for providing a restricted passageway for the movement of air from said transversely extending portion of the cylinder into said combustion chamber in such direction as to cause an eddy effect in the air in said combustion chamber.

2. In a U-type combustion engine, the combination of a cylinder block having two cylinders side by side therein, pistons movable along said cylinders respectively, a circular chamber at the ends of both cylinders and in communication with both with at least one of the cylinders having a portion extending transversely beyond the side face of the chamber, a head closing the ends of the cylinders about said combustion chamber, a plate on the end of the piston in said one cylinder shaped and positioned to have an operative closure effect with the side wall of said combustion chamber when said piston approaches the end of its movement toward said head for trapping a quantity of air in said transversely extending portion of the cylinder, means on the inner face of said chamber in position to have an operative closure effect with one end of said plate, and means on the inner face of said chamber in position to cooperate with the opposite end of said plate for providing a restricted passageway for the movement of air from said transversely extending portion of the cylinder in substantially tangential direction to said chamber for causing an eddy effect in the air of said chamber.

CONSTANTINE N. GUERASIMOFF.

REFERENCES CITED

The following references are of record in the file of this patent:

UNITED STATES PATENTS

| Number | Name | Date |
|---|---|---|
| 841,830 | Wackenhuth | Jan. 22, 1907 |
| 1,127,810 | Rogers | Feb. 9, 1915 |
| 1,239,523 | Rogers | Sept. 11, 1917 |
| 1,609,449 | Williams | Dec. 7, 1926 |
| 1,662,989 | Stroud | Mar. 20, 1928 |
| 1,684,074 | Schaeren | Sept. 11, 1928 |
| 1,741,417 | Hewitt | Dec. 31, 1929 |
| 1,767,701 | Riehm | June 24, 1930 |
| 1,838,495 | O'Neill | Dec. 29, 1931 |
| 1,867,683 | Sperry | July 19, 1932 |
| 1,914,793 | Sydlowski | June 20, 1933 |
| 1,927,374 | Ricardo | Sept. 19, 1933 |
| 1,942,127 | Russell et al. | Jan. 2, 1934 |
| 1,977,752 | Baj | Oct. 23, 1934 |
| 1,993,179 | Nibbs | Mar. 5, 1935 |
| 2,006,613 | Wirrer | July 2, 1935 |
| 2,019,298 | Fischer | Oct. 29, 1935 |
| 2,054,562 | Haag | Sept. 15, 1936 |
| 2,062,951 | Treiber | Dec. 1, 1936 |
| 2,067,461 | Ramsey | Jan. 12, 1937 |
| 2,097,206 | Candlish | Oct. 26, 1937 |
| 2,099,416 | Rube | Nov. 16, 1937 |
| 2,121,813 | Mirchell | June 28, 1938 |
| 2,142,084 | Portman | Dec. 27, 1938 |
| 2,146,032 | Scott | Feb. 7, 1939 |
| 2,184,603 | Portman | Dec. 26, 1939 |
| 2,204,068 | Chapman | June 11, 1940 |
| 2,206,322 | Huesley | July 2, 1940 |
| 2,208,631 | Dietrich | July 23, 1940 |
| 2,132,805 | Rosen | Oct. 11, 1938 |
| 2,214,891 | Schrom | Sept. 17, 1940 |
| 2,243,263 | Starr | May 27, 1941 |
| 2,295,120 | Maw | Sept. 8, 1942 |
| 2,336,918 | Ashe | Dec. 14, 1943 |

FOREIGN PATENTS

| Number | Country | Date |
|---|---|---|
| 15,981 | Denmark | May 9, 1912 |
| 461,336 | Germany | June 22, 1928 |
| 694,905 | France | 1930 |
| 615,602 | Germany | July 8, 1935 |
| 369,229 | England | Mar. 16, 1932 |
| 373,647 | England | May 17, 1932 |
| 79,068 | Sweden | Nov. 28, 1933 |
| 442,340 | England | Feb. 6, 1936 |
| 710,978 | France | Nov. 1, 1931 |
| 821,488 | France | Dec. 6, 1937 |
| 523,137 | England | July 5, 1940 |
| 704,734 | Germany | 1941 |
| 102,667 | Sweden | Sept. 30, 1941 |
| 355,813 | England | No date |